(12) United States Patent
Ono (10) Patent No.: US 11,403,560 B2
(45) Date of Patent: Aug. 2, 2022

(54) TRAINING APPARATUS, IMAGE RECOGNITION APPARATUS, TRAINING METHOD, AND PROGRAM (71) Applicant: Sony Interactive Entertainment Inc., Tokyo (JP)

(72) Inventor: Daichi Ono, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 524 days.

(21) Appl. No.: 16/603,085

(22) PCT Filed: Apr. 26, 2017

(86) PCT No.: PCT/JP2017/016565
§ 371 (c)(1),
(2) Date: Oct. 4, 2019

(87) PCT Pub. No.: WO2018/198233
PCT Pub. Date: Nov. 1, 2018

(65) Prior Publication Data
US 2021/0056464 A1 Feb. 25, 2021

(51) Int. Cl.
*G06Q 40/00* (2012.01)
*G06N 20/00* (2019.01)
(Continued)

(52) U.S. Cl.
CPC .......... *G06N 20/00* (2019.01); *G06K 9/6268* (2013.01); *G06V 20/10* (2022.01); *G06N 3/08* (2013.01)

(58) Field of Classification Search
USPC ....... 705/37, 38, 39, 40, 30; 706/46; 726/25, 726/2; 715/700, 708; 707/793; 235/375,
(Continued)

(56) References Cited

U.S. PATENT DOCUMENTS 9,665,803 B2   5/2017  Aoba
2005/0069278 A1* 3/2005 Akahori ............... G06F 16/583
                                                      707/E17.02
(Continued)

FOREIGN PATENT DOCUMENTS

JP      5073663 A    3/1993
JP   2014137756 A    7/2014

OTHER PUBLICATIONS

Object recognition in images using convolutional neural network; 2018 2nd International Conference on Inventive Systems and Control (ICISC) (pp. 718-821); Duth P. Sudharshan; Swathi Raj; Jan. 19, 2018. (Year: 2018).*

(Continued)

*Primary Examiner* — Tien C Nguyen
(74) *Attorney, Agent, or Firm* — Matthew B. Dernier, Esq.

(57) ABSTRACT

Provided are a training apparatus, an image recognition apparatus, a training method, and a program capable of improving the accuracy of image recognition of a photographic image using classifiers that have been trained using CG images. An intermediate feature identifying section identifies an intermediate feature. An offset feature identifying section identifies an offset feature on the basis of a CG intermediate feature and a photographic intermediate feature. A post-offset intermediate feature identifying section identifies a post-offset intermediate feature associated with a CG image on the basis of the intermediate feature associated with the CG image and the offset feature. A second-classifier training section executes training of a second classifier using the post-offset intermediate feature associated with the CG image, the second classifier being configured to receive, in a case where image recognition is performed on a photo- (Continued)

graphic image, the intermediate feature associated with the photographic image.

6 Claims, 7 Drawing Sheets

(51) Int. Cl.
*G06K 9/62* (2022.01)
*G06V 20/10* (2022.01)
*G06N 3/08* (2006.01)

(58) Field of Classification Search
USPC .......................................... 235/380; 700/236
See application file for complete search history.

(56) References Cited

U.S. PATENT DOCUMENTS

| | | | |
|---|---|---|---|
| 2014/0198951 A1 | 7/2014 | Aoba | |
| 2016/0035069 A1* | 2/2016 | Min | G06T 5/10 382/266 |
| 2017/0116728 A1* | 4/2017 | Codella | A61B 6/5217 |
| 2018/0033147 A1* | 2/2018 | Becker | G06V 10/768 |
| 2019/0149725 A1* | 5/2019 | Adato | H04N 5/23293 348/158 |
| 2019/0180146 A1* | 6/2019 | Sacheti | G06K 9/6271 |

OTHER PUBLICATIONS

An Overview of Recent Convolutional Neural Network Algorithms for Image Recognition; 2018 IEEE 61st International Midwest Symposium on Circuits and Systems (MWSCAS) (pp. 743-746); Genevieve Sapijaszko, Wasfy B. Mikhael; Aug. 5, 2018. (Year: 2018).*
International Preliminary Report on Patentability and Written Opinion for corresponding Application PCT/JP2017/016565, 13 pages, dated Oct. 29, 2019.
Supplementary European Search Rpeort for corresponding Application EP 17907458, 7 pages, dated Nov. 6, 2020.
Rozantsev Artem, et al., "On Rendering Synthetic images for training an object detector," Computer Vision and Image Understanding, Academic Press, vol. 137, pp. 24-37 Jan. 20, 2015.
International Search Report for corresponding Application PCT/JP2017/016565, 4 pages, dated Aug. 8, 2017.
Ken taro Taji et al., "Fingerspelling Recognition based on AdaBoost with Hand-shape CG images", IE ICE Technical Report, vol. 111, No. 472, pp. 7-12, Mar. 2, 2012.
Masamitsu Tsuchiya et al., "Hybrid Transfer Learning for Efficient Learning In Object Detection", IEICE Technical Report, vol. 112, No. 386, pp. 329-334, Jan. 16, 2013.

* cited by examiner

TRAINING APPARATUS, IMAGE RECOGNITION APPARATUS, TRAINING METHOD, AND PROGRAM

TECHNICAL FIELD

The present invention relates to a training apparatus, an image recognition apparatus, a training method, and a program.

BACKGROUND ART

In recent years, attention has been paid to a technique for image recognition of a photographic image using a classifier in the field of machine learning.

Semantic segmentation is one of the techniques for image recognition of a photographic image using the classifier. Through the semantic segmentation, the meaning of a pixel, such as an object represented by the pixel, is identified for each pixel included in an input photographic image.

Further, there exist other examples of the techniques for image recognition of a photographic image using the classifier. The examples of the techniques include a technique for identifying what an input photographic image is and a technique for identifying what is placed where in the input photographic image.

SUMMARY

Technical Problems

In order to improve the accuracy of image recognition of a photographic image using the classifier such as semantic segmentation, it is necessary to train the classifier using a large number of photographic images. Obtaining a large number of photographic images is, however, difficult. In light of such circumstances, one possible approach is to train the classifier using computer graphics (CG) images created by computer graphics technology, instead of using photographic images.

However, there is a difference in the feature between a CG image and a photographic image even if the CG image is similar to the photographic image. Moreover, due to the difference in the feature, there has been a limit to improvement in the accuracy of image recognition of a photographic image using the classifier that has been trained using CG images.

The present invention has been made in view of the problems described above. One of objects of the present invention is to provide a training apparatus, an image recognition apparatus, a training method, and a program capable of improving the accuracy of image recognition of a photographic image using classifiers that have been trained using CG images.

Solution to Problems

In order to solve the problems described above, a training apparatus according to the present invention includes: an intermediate feature identifying section configured to identify an output from an intermediate layer included in a first classifier as an intermediate feature associated with an image in a case where input data of the image has been input into the first classifier, the first classifier being configured to classify a CG image and a photographic image; an offset feature identifying section configured to identify an offset feature on the basis of: the intermediate feature associated with one CG image or a plurality of the intermediate features each associated with a corresponding one of a plurality of CG images; and the intermediate feature associated with one photographic image or a plurality of the intermediate features each associated with a corresponding one of a plurality of photographic images; a post-offset intermediate feature identifying section configured to identify a post-offset intermediate feature associated with a CG image on the basis of the intermediate feature associated with the CG image and the offset feature; and a training section configured to execute training of a second classifier using a plurality of the post-offset intermediate features each associated with a corresponding one of a plurality of CG images, the second classifier being configured to receive, in a case where image recognition is performed on a photographic image, the intermediate feature associated with the photographic image.

In one aspect of the present invention, the offset feature identifying section is configured to identify the offset feature on the basis of a representative value of the plurality of the intermediate features each associated with the corresponding one of the plurality of CG images and a representative value of the plurality of the intermediate features each associated with the corresponding one of the plurality of photographic images.

Further, in one aspect of the present invention, the first classifier includes a classifier that has been trained using training data of a CG image and training data of a photographic image.

Further, an image recognition apparatus according to the present invention includes: an intermediate feature identifying section configured to identify an output from an intermediate layer included in a first classifier as an intermediate feature associated with an image in a case where input data of the image has been input into the first classifier, the first classifier being configured to classify a CG image and a photographic image; a post-offset intermediate feature identifying section configured to identify a post-offset intermediate feature associated with a photographic image on the basis of: the intermediate feature associated with the photographic image subjected to image recognition; and an offset feature based on: the intermediate feature associated with one CG image or a plurality of the intermediate features each associated with a corresponding one of a plurality of CG images; and the intermediate feature associated with one photographic image or a plurality of the intermediate features each associated with a corresponding one of a plurality of photographic images; and an image recognition executing section configured to identify an output from a second classifier as a result of the image recognition of the photographic image in a case where the post-offset intermediate feature associated with the photographic image subjected to the image recognition has been input as input data into the second classifier that has been trained using the plurality of the intermediate features each associated with the corresponding one of the plurality of CG images.

Further, a training method according to the present invention includes: a step of identifying an output from an intermediate layer included in a first classifier as an intermediate feature associated with an image in a case where input data of the image has been input into the first classifier, the first classifier being configured to classify a CG image and a photographic image; a step of identifying an offset feature on the basis of: the intermediate feature associated with one CG image or a plurality of the intermediate features each associated with a corresponding one of a plurality of CG images; and the intermediate feature associated with one photographic image or a plurality of the intermediate features each associated with a corresponding one of a plurality of photographic images; a step of identifying a post-offset intermediate feature associated with a CG image on the basis of the intermediate feature associated with the CG image and the offset feature; and a step of executing training of a second classifier using a plurality of the post-offset intermediate features each associated with a corresponding one of a plurality of CG images, the second classifier being configured to receive, in a case where image recognition is performed on a photographic image, the intermediate feature associated with the photographic image.

Further, an image recognition method according to the present invention includes: a step of identifying an output from an intermediate layer included in a first classifier as an intermediate feature associated with an image in a case where input data of the image has been input into the first classifier, the first classifier being configured to classify a CG image and a photographic image; a step of identifying a post-offset intermediate feature associated with a photographic image on the basis of: the intermediate feature associated with the photographic image subjected to image recognition; and an offset feature based on: the intermediate feature associated with one CG image or a plurality of the intermediate features each associated with a corresponding one of a plurality of CG images; and the intermediate feature associated with one photographic image or a plurality of the intermediate features each associated with a corresponding one of a plurality of photographic images; and a step of identifying an output from a second classifier as a result of the image recognition of the photographic image in a case where the post-offset intermediate feature associated with the photographic image subjected to the image recognition has been input as input data into the second classifier that has been trained using the plurality of the intermediate features each associated with the corresponding one of the plurality of CG images.

Further, a program according to the present invention causes a computer to execute: a step of identifying an output from an intermediate layer included in a first classifier as an intermediate feature associated with an image in a case where input data of the image has been input into the first classifier, the first classifier being configured to classify a CG image and a photographic image; a step of identifying an offset feature on the basis of: the intermediate feature associated with one CG image or a plurality of the intermediate features each associated with a corresponding one of a plurality of CG images; and the intermediate feature associated with one photographic image or a plurality of the intermediate features each associated with a corresponding one of a plurality of photographic images; a step of identifying a post-offset intermediate feature associated with a CG image on the basis of the intermediate feature associated with the CG image and the offset feature; and a step of executing training of a second classifier using a plurality of the post-offset intermediate features each associated with a corresponding one of a plurality of CG images, the second classifier being configured to receive, in a case where image recognition is performed on a photographic image, the intermediate feature associated with the photographic image.

Further, another program according to the present invention causes a computer to execute: a step of identifying an output from an intermediate layer included in a first classifier as an intermediate feature associated with an image in a case where input data of the image has been input into the first classifier, the first classifier being configured to classify a CG image and a photographic image; a step of identifying a post-offset intermediate feature associated with a photographic image on the basis of: the intermediate feature associated with the photographic image subjected to image recognition; and an offset feature based on: the intermediate feature associated with one CG image or a plurality of the intermediate features each associated with a corresponding one of a plurality of CG images; and the intermediate feature associated with one photographic image or a plurality of the intermediate features each associated with a corresponding one of a plurality of photographic images; and a step of identifying an output from a second classifier as a result of the image recognition of the photographic image in a case where the post-offset intermediate feature associated with the photographic image subjected to the image recognition has been input as input data into the second classifier that has been trained using the plurality of the intermediate features each associated with the corresponding one of the plurality of CG images.

DESCRIPTION OF EMBODIMENTS

Hereinafter, one embodiment of the present invention will be described in detail with reference to the drawings.

Figure 1:
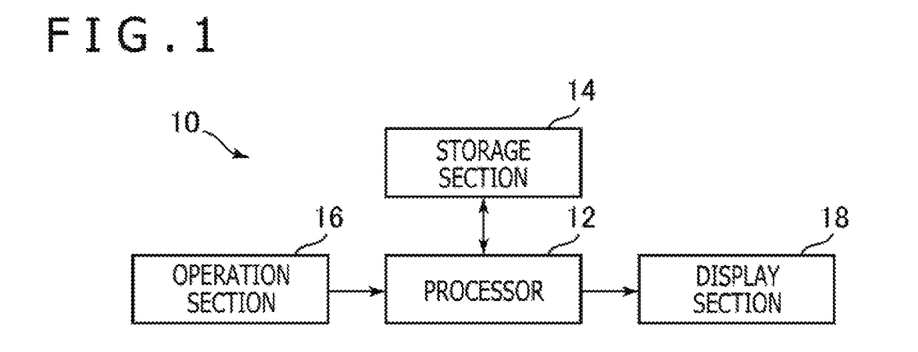
FIG. 1 is a diagram of a configuration of an information processing apparatus according to one embodiment of the present invention.

FIG. 1 is a diagram of a configuration of an information processing apparatus 10 according to one embodiment of the present invention. The information processing apparatus 10 according to the present embodiment is, for example, a computer such as a game console or a personal computer. As illustrated in FIG. 1, the information processing apparatus 10 according to the present embodiment includes a processor 12, a storage section 14, an operation section 16, and a display section 18, for example.

The processor 12 is a program control device such as a central processing unit (CPU) that operates according to a program installed in the information processing apparatus 10, for example.

The storage section 14 is a storage device such as a read-only memory (ROM) or a random access memory (RAM), a hard disk drive, or the like. The storage section 14 stores the program and the like to be executed by the processor 12.

The operation section 16 is a user interface such as a keyboard, a mouse, or a controller of a game console. The operation section 16 receives an operation input from the user and outputs a signal indicating what is input into the processor 12.

The display section 18 is a display device such as a liquid crystal display, and displays various images according to instructions received from the processor 12.

It is noted that the information processing apparatus 10 may include a communication interface such as a network board, an optical disc drive for reading an optical disc such as a digital versatile disc (DVD)-ROM or a Blu-ray (registered trademark) disc, a universal serial bus (USB) port, and the like.

Classifiers using a convolutional neural network are implemented in the information processing apparatus 10 according to the present embodiment. Moreover, the information processing apparatus 10 according to the present embodiment executes an image recognition process such as semantic segmentation of a photographic image. The photographic image is an image obtained by capturing a real space with a camera.

Figure 2:
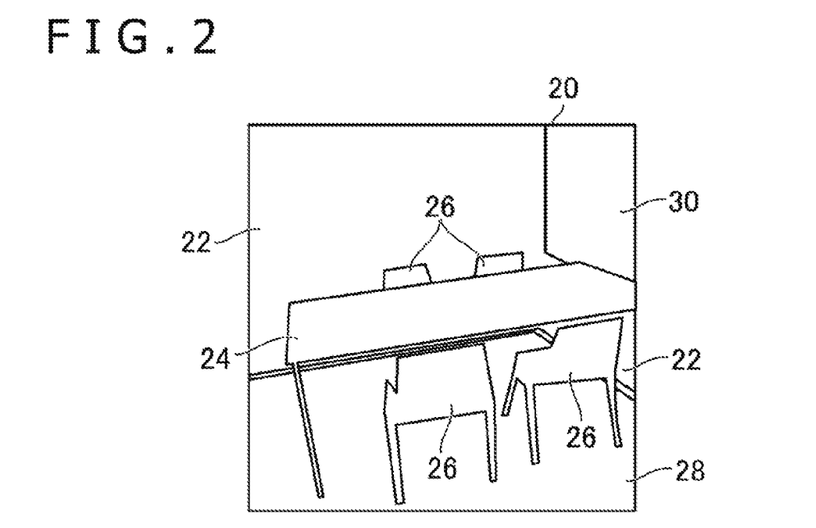
FIG. 2 is a view illustrating an example of an execution result image.

FIG. 2 is a view illustrating an example of an execution result image 20. The execution result image 20 is an image obtained as a result of execution of semantic segmentation of a photographic image. As illustrated in FIG. 2, the execution result image 20 is divided, on a pixel-by-pixel basis, into a plurality of areas associated with categories corresponding to objects. Each of the objects is the result of recognition.

In the example in FIG. 2, a wall area 22, a desk area 24, a chair area 26, a floor area 28, and a curtain area 30 are illustrated. The wall area 22 is associated with a wall. The desk area 24 is associated with a desk. The chair area 26 is associated with chairs. The floor area 28 is associated with a floor. The curtain area 30 is associated with a curtain. Here, a plurality of areas separated from each other such as the wall area 22 and the chair area 26 may be recognized as an area of the same category.

Here, each area may be expressed in a color according to the category associated with the area. With this configuration, displaying the execution result image 20 on the display section 18, for example, allows the user to check, for each area, the category corresponding to the area.

Further, for example, the execution result image 20 may be used as an input for various controls such as automatic driving control of a vehicle.

In order to improve the accuracy of image recognition of a photographic image using the classifiers such as semantic segmentation, it is necessary to train the classifiers using a large number of photographic images. Obtaining a large number of photographic images is, however, difficult.

In light of such circumstances, in the present embodiment, the classifiers are trained using CG images created by computer graphics technology, instead of using photographic images, as described below.

Hereinafter, functions of the information processing apparatus 10 according to the present embodiment and processes executed by the information processing apparatus 10 will be further described.

Figure 3:
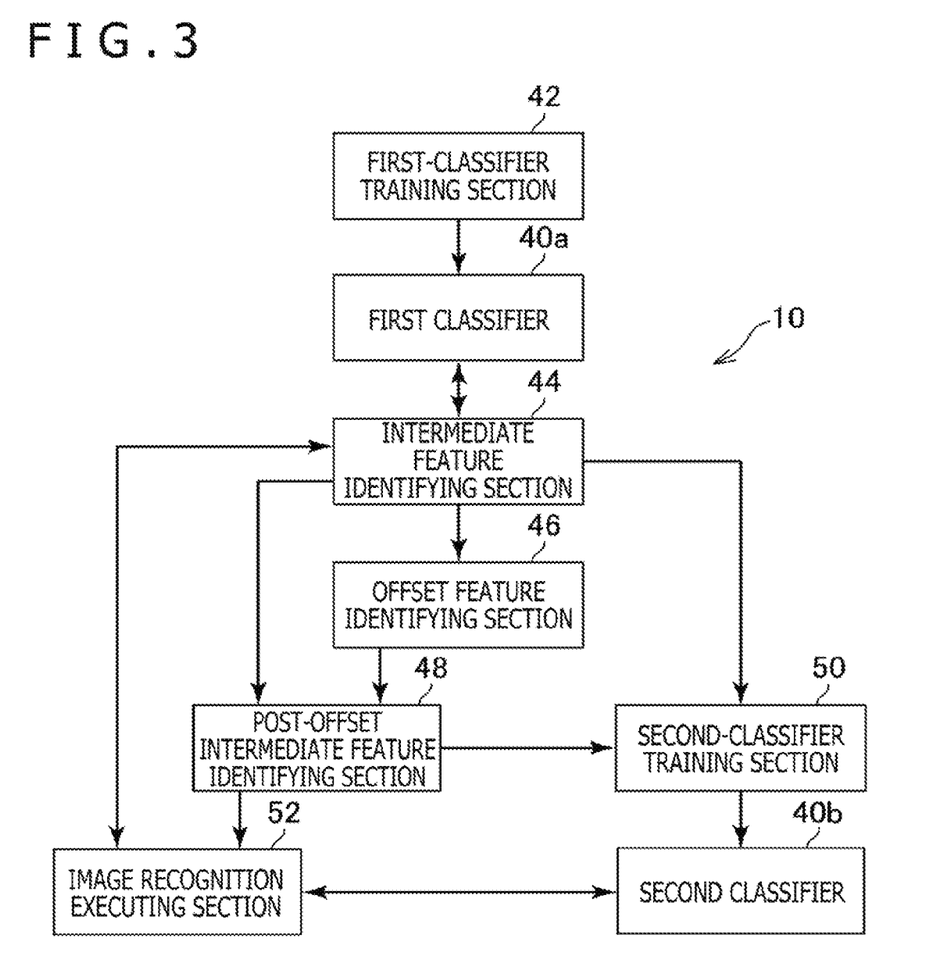
FIG. 3 is a functional block diagram illustrating an example of functions implemented in the information processing apparatus according to one embodiment of the present invention.

FIG. 3 is a functional block diagram illustrating an example of the functions implemented in the information processing apparatus 10 according to the present embodiment. It is noted that the information processing apparatus 10 according to the present embodiment does not necessarily implement all the functions illustrated in FIG. 3 and may also implement functions other than the functions illustrated in FIG. 3.

As illustrated in FIG. 3, the information processing apparatus 10 functionally includes, for example, a first classifier 40a, a second classifier 40b, a first-classifier training section 42, an intermediate feature identifying section 44, an offset feature identifying section 46, a post-offset intermediate feature identifying section 48, a second-classifier training section 50, and an image recognition executing section 52. The above-described components are mainly implemented in the processor 12 and the storage section 14. The information processing apparatus 10 according to the present embodiment has roles both as a training apparatus that uses the classifiers to learn images and as an image recognition apparatus that executes image recognition using the trained classifiers.

The above-described functions may be implemented by causing the processor 12 to execute a program including instructions corresponding to the above-described functions installed in the information processing apparatus 10, which is a computer. This program may be supplied to the information processing apparatus 10 through a computer-readable information storage medium such as an optical disc; a magnetic disk; a magnetic tape; a magneto-optical disc; or a flash memory or through the Internet or the like, for example.

Figure 4:
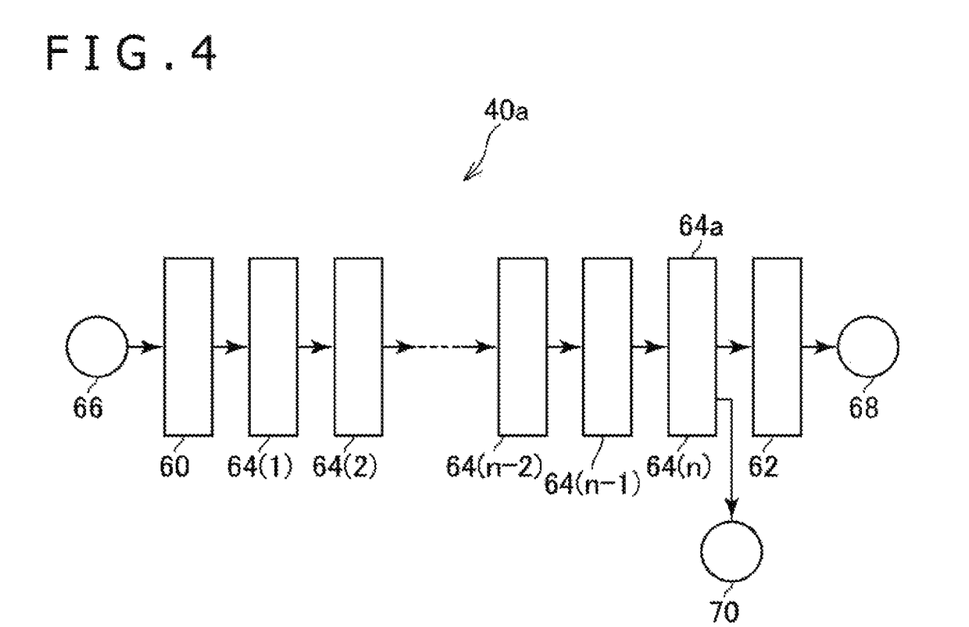
FIG. 4 is a diagram schematically illustrating an example of a first classifier.

In the present embodiment, the first classifier 40a is, for example, a classifier that classifies a CG image and a photographic image and is schematically illustrated in FIG. 4. The first classifier 40a may be a binary classifier. Further, the first classifier 40a may be, for example, a classifier using the convolutional neural network including a convolutional layer, a pooling layer, a fully-connected layer, and the like. The first classifier 40a according to present embodiment includes one input layer 60, one output layer 62, and n intermediate layers 64 (64(1), 64(2), . . . , 64($n$−2), 64($n$−1), and 64($n$)). Here, n is an integer of 1 or greater. It is noted that although the five intermediate layers 64 are illustrated in FIG. 4, the number of intermediate layers 64 may be four or less. Further, an input 66 into the input layer 60 and an output 68 from the output layer 62 are also illustrated in FIG. 4. Further, an output 70 from the intermediate layer 64($n$) is also illustrated in FIG. 4. The output 70 will be described later.

Figure 5:
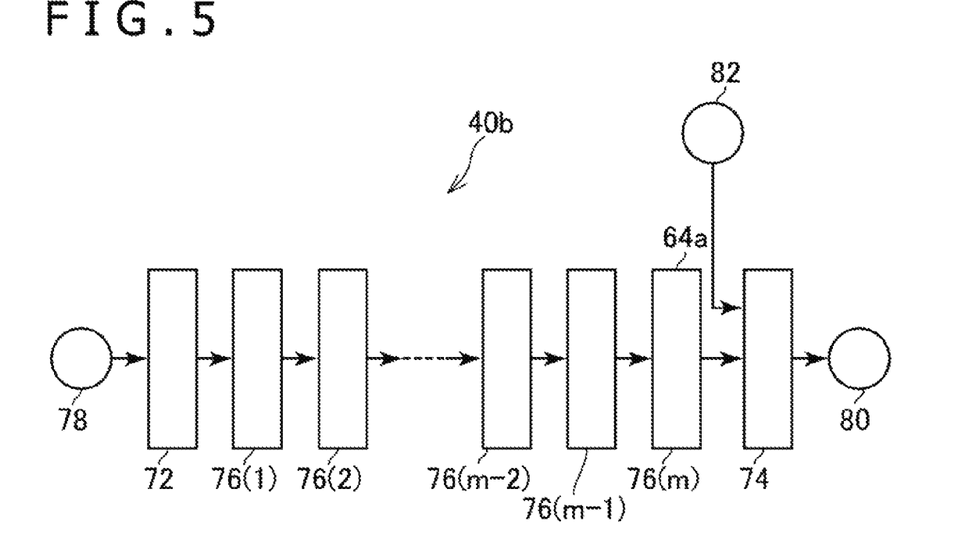
FIG. 5 is a diagram schematically illustrating an example of a second classifier.

In the present embodiment, the second classifier 40b is, for example, a classifier that executes image recognition such as semantic segmentation of a photographic image and is schematically illustrated in FIG. 5. The second classifier 40b may be, for example, a classifier using the convolutional neural network including the convolutional layer, the pooling layer, the fully-connected layer, and the like. The second classifier 40b according to the present embodiment includes one input layer 72, one output layer 74, and m intermediate layers 76 (76(1), 76(2), . . . , 76($m$−2), 76($m$−1), and 76($m$)). Here, m is an integer of 1 or greater. Further, the value m may be the same as or different from the above-described value n. It is noted that although the five intermediate layers 76 are illustrated in FIG. 5, the number of intermediate layers 76 may be four or less. Further, an input 78 into the input layer 72 and an output 80 from the output layer 74 are also illustrated in FIG. 5. Further, an input 82 into the intermediate layer 76($m$) is also illustrated in FIG. 5. The input 82 will be described later.

In the present embodiment, an output from a specific one intermediate layer 64 included in the first classifier 40a (the output 70 from the intermediate layer 64(n) in the example in FIG. 4) is used as the input 78 into the second classifier 40b. Here, the output 70 may be an image (map) that is an output from the convolutional layer or the pooling layer.

Hereinafter, the intermediate layer 64 whose output is used as the input 78 into the second classifier 40b will be referred to as a specific intermediate layer 64a. In the example in FIG. 4, the intermediate layer 64(n) is the specific intermediate layer 64a. Here, instead of the intermediate layer 64(n), the intermediate layer 64(n−1), the intermediate layer 64(n−2), or the like which is the intermediate layer 64 placed before the intermediate layer 64(n) may be the specific intermediate layer 64a. In this case, the output from the intermediate layer 64(n−1), the intermediate layer 64(n−2), or the like is used as the input 78 into the second classifier 40b.

The first-classifier training section 42 executes training of the first classifier 40a using a plurality of images as training data. Here, for example, the training may be performed using training data of a plurality of CG images and training data of a plurality of photographic images.

Here, the training data may include input data that is input as the input 66 into the first classifier 40a and teaching data that is compared with the output 68 in a case where the input data has been input. In this manner, supervised learning using the training data including the teaching data may be performed.

Here, input data of a CG image refers to data or the like generated by performing a predetermined preprocess on the CG image. Further, input data of a photographic image refers to data or the like generated by performing a predetermined preprocess on the photographic image. It is noted that the preprocesses may be performed such that the input data of the CG image and the input data of the photographic image can be handled in the same manner. For example, the preprocesses may be performed such that the input data of the CG image and the input data of the photographic image can be handled as data in the same format.

Through the training executed by the first-classifier training section 42, values of parameters of the first classifier 40a are set to appropriate values. The values of the parameters indicate coefficients of filters of the convolutional layer, the weights of the fully-connected layer, and the like. For example, a backpropagation or the like is performed to adjust the values of the parameters of the first classifier 40a on the basis of a comparison between teaching data included in training data and the output 68 in a case where input data included in the training data has been used as the input 66.

In the present embodiment, for example, the intermediate feature identifying section 44 identifies, as an intermediate feature associated with an image, the output 70 from the above-described specific intermediate layer 64a in a case where input data of the image has been input into the first classifier 40a. Here, the first classifier 40a that receives the input data may be a classifier (trained classifier) that has been trained by the first-classifier training section 42 using training data of a CG image and training data of a photographic image. Hereinafter, the intermediate feature associated with a CG image will be referred to as a CG intermediate feature. The intermediate feature associated with a photographic image will be referred to as a photographic intermediate feature.

The offset feature identifying section 46 identifies an offset feature on the basis of: the CG intermediate feature associated with one CG image or the CG intermediate features each associated with a corresponding one of a plurality of CG images; and the photographic intermediate feature associated with one photographic image or the photographic intermediate features each associated with a corresponding one of a plurality of photographic images.

Here, for example, the intermediate feature identifying section 44 may identify an individual CG intermediate feature, which is the output 70 from the specific intermediate layer 64a in a case where input data of a CG image has been input into the trained first classifier 40a. Moreover, the intermediate feature identifying section 44 may identify the CG intermediate feature on the basis of individual CG intermediate features identified for a plurality of CG images. For example, the intermediate feature identifying section 44 may identify, as the value of the CG intermediate feature, a representative value such as an average value of the individual CG intermediate features identified for the plurality of CG images. It is noted that the intermediate feature identifying section 44 may identify, as the value of the CG intermediate feature, an individual CG intermediate feature identified for one CG image.

Further, for example, the intermediate feature identifying section 44 may identify an individual photographic intermediate feature, which is the output 70 from the specific intermediate layer 64a in a case where input data of a photographic image has been input into the trained first classifier 40a. Moreover, the intermediate feature identifying section 44 may identify the photographic intermediate feature on the basis of individual photographic intermediate features identified for a plurality of photographic images. For example, the intermediate feature identifying section 44 may identify, as the value of the photographic intermediate feature, a representative value such as an average value of the individual photographic intermediate features identified for the plurality of photographic images. It is noted that the intermediate feature identifying section 44 may identify, as the photographic intermediate feature, an individual photographic intermediate feature identified for one photographic image.

As the offset feature, moreover, the offset feature identifying section 46 may identify the difference between the CG intermediate feature and the photographic intermediate feature that have been identified as above.

Here, for example, the intermediate feature identifying section 44 may identify an individual CG intermediate feature associated with a CG image and an individual photographic intermediate feature associated with a photographic image for a combination of the CG image and the photographic image. Here, the CG image and the photographic image included in the combination may be images similar to each other. For example, the CG image and the photographic image included in the combination may be images representing the same object. Then, the offset feature identifying section 46 may identify, as an individual offset feature, the difference between the individual CG intermediate feature and the individual photographic intermediate feature. Moreover, the offset feature identifying section 46 may identify the offset feature on the basis of individual offset features each identified for a corresponding one of a plurality of combinations of CG images and photographic images. For example, the offset feature identifying section 46 may identify, as the offset feature, a representative value such as an average value of the individual offset features each identified for a corresponding one of the plurality of combinations of CG images and photographic images.

In the present embodiment, for example, the post-offset intermediate feature identifying section 48 identifies a post-offset intermediate feature associated with a CG image on the basis of the intermediate feature associated with the CG image and the offset feature, for example. Further, in the present embodiment, the post-offset intermediate feature identifying section 48 identifies a post-offset intermediate feature associated with a photographic image on the basis of the intermediate feature associated with a photographic image and the offset feature, for example.

Here, for example, a value of the offset feature is assumed to be a value obtained by subtracting a value of the CG intermediate feature from a value of the photographic intermediate feature. In this case, a value obtained by adding the value of the offset feature to a value of the intermediate feature of a CG image may be calculated as a value of the post-offset intermediate feature associated with the CG image. Further, a value obtained by subtracting the value of the offset feature from a value of the intermediate feature of a photographic image may be calculated as a value of the post-offset intermediate feature associated with the photographic image.

Conversely, for example, a value of the offset feature is assumed to be a value obtained by subtracting a value of the photographic intermediate feature from a value of the CG intermediate feature. In this case, a value obtained by subtracting the value of the offset feature from a value of the intermediate feature of a CG image may be calculated as a value of the post-offset intermediate feature associated with the CG image. Further, a value obtained by adding the value of the offset feature to a value of the intermediate feature of a photographic image may be calculated as a value of the post-offset intermediate feature associated with the photographic image.

Hereinafter, the post-offset intermediate feature associated with a CG image will be referred to as a post-offset CG intermediate feature. The post-offset intermediate feature associated with a photographic image will be referred to as a post-offset photographic intermediate feature.

Here, the post-offset CG intermediate feature associated with a CG image corresponds to the photographic intermediate feature of a photographic image in a case where the photographic image similar to the CG image is assumed to exist. Further, the post-offset photographic intermediate feature associated with a photographic image corresponds to the CG intermediate feature of a CG image in a case where the CG image similar to the photographic image is assumed to exist.

In the present embodiment, for example, the second-classifier training section 50 executes training of the second classifier 40b. Here, the second-classifier training section 50 may execute training of the second classifier 40b using the CG intermediate feature associated with a CG image as input data included in training data. In this case, the training data may include, as the input data, the CG intermediate feature associated with the CG image. The training data may also include, as teaching data, an image which is associated with the CG image and whose area is divided by categories. An example of the image is the execution result image 20 illustrated in FIG. 2. Moreover, supervised learning using the training data including the teaching data may be performed.

Further, the second-classifier training section 50 may execute training of the second classifier 40b using the post-offset CG intermediate feature associated with a CG image as input data included in training data. In this case, the training data may include, as the input data, the post-offset CG intermediate feature associated with the CG image. The training data may also include, as teaching data, an image which is associated with the CG image and whose area is divided by categories. An example of the image is the execution result image 20 illustrated in FIG. 2. Moreover, supervised learning using the training data including the teaching data may be performed.

In the present embodiment, for example, in a case where the second-classifier training section 50 executes training of the second classifier 40b, data for interpolating spatial information is input as the input 82 into the intermediate layer 76(m). For example, in a case where the second-classifier training section 50 executes training of the second classifier 40b using the intermediate feature of a CG image as training data, input data of the CG image may be input as the input 82 into the intermediate layer 76(m). Further, for example, in a case where the second-classifier training section 50 executes training of the second classifier 40b using the post-offset intermediate feature of a CG image as training data, input data of the CG image may be input as the input 82 into the intermediate layer 76(m).

Through the training executed by the second-classifier training section 50, values of parameters of the second classifier 40b are set to appropriate values. The values of the parameters indicate coefficients of filters of the convolutional layer, the weights of the fully-connected layer, and the like. For example, the backpropagation or the like is performed to adjust the values of the parameters of the second classifier 40b on the basis of, for example, a comparison between the output 80 in a case where the CG intermediate feature associated with a CG image has been used as the input 78 and teaching data associated with the CG image. Alternatively, the values of the parameters of the second classifier 40b are adjusted on the basis of, for example, a comparison between the output 80 in a case where the post-offset CG intermediate feature associated with a CG image has been used as the input 78 and teaching data associated with the CG image.

In the present embodiment, for example, the image recognition executing section 52 executes the image recognition process such as semantic segmentation.

In the present embodiment, for example, in a case where the image recognition executing section 52 executes image recognition of a photographic image, data for interpolating spatial information is input as the input 82 into the intermediate layer 76(m). For example, in a case where the image recognition executing section 52 executes image recognition of a photographic image, input data of the photographic image may be input as the input 82 into the intermediate layer 76(m).

For example, the second-classifier training section 50 is assumed to have executed training of the second classifier 40b using the post-offset CG intermediate features each associated with a corresponding one of a plurality of CG images as input data included in training data.

In this case, the second classifier 40b has executed training using the post-offset CG intermediate features associated with the CG images. That is, the second classifier 40b has executed training using the post-offset CG intermediate features corresponding to the respective photographic intermediate features of photographic images in a case where the photographic images similar to the CG images are assumed to exist. In this case, therefore, it is desirable that the input 78 is an input corresponding to a photographic image. Accordingly, in this case, in the present embodiment, the image recognition executing section 52 inputs, as the input 78, the photographic intermediate feature associated with the photographic image subjected to image recognition into the second classifier 40b.

Then, in this case, the image recognition executing section 52 identifies, as the result of the image recognition of the photographic image, the output 80 of the second classifier 40b in a case where the photographic intermediate feature associated with the photographic image subjected to the image recognition has been input into the second classifier 40b.

Further, for example, the second-classifier training section 50 is assumed to have executed training of the second classifier 40b using the CG intermediate features each associated with a corresponding one of a plurality of CG images as input data included in training data.

In this case, since the second classifier 40b has been trained using the CG intermediate features, it is desirable that the input 78 is an input corresponding to a CG image. Therefore, in this case, in the present embodiment, the image recognition executing section 52 inputs, as the input 78, the post-offset photographic intermediate feature associated with a photographic image subjected to image recognition into the second classifier 40b. As described above, the post-offset photographic intermediate feature corresponds to the CG intermediate feature of a CG image in a case where the CG image similar to the photographic image subjected to image recognition is assumed to exist.

Then, in this case, the image recognition executing section 52 identifies, as the result of the image recognition of the photographic image, the output 80 of the second classifier 40b in a case where the post-offset photographic intermediate feature associated with the photographic image subjected to image recognition has been input as the input data into the trained second classifier 40b.

It is noted that in a case where the second-classifier training section 50 executes training of the second classifier 40b or in a case where the image recognition executing section 52 executes image recognition of a photographic image, it is not necessary to input data for interpolating spatial information into the intermediate layer 76(m) as the input 82. The data for interpolating spatial information may be input into the intermediate layer 76 other than the intermediate layer 76(m).

Figure 6:
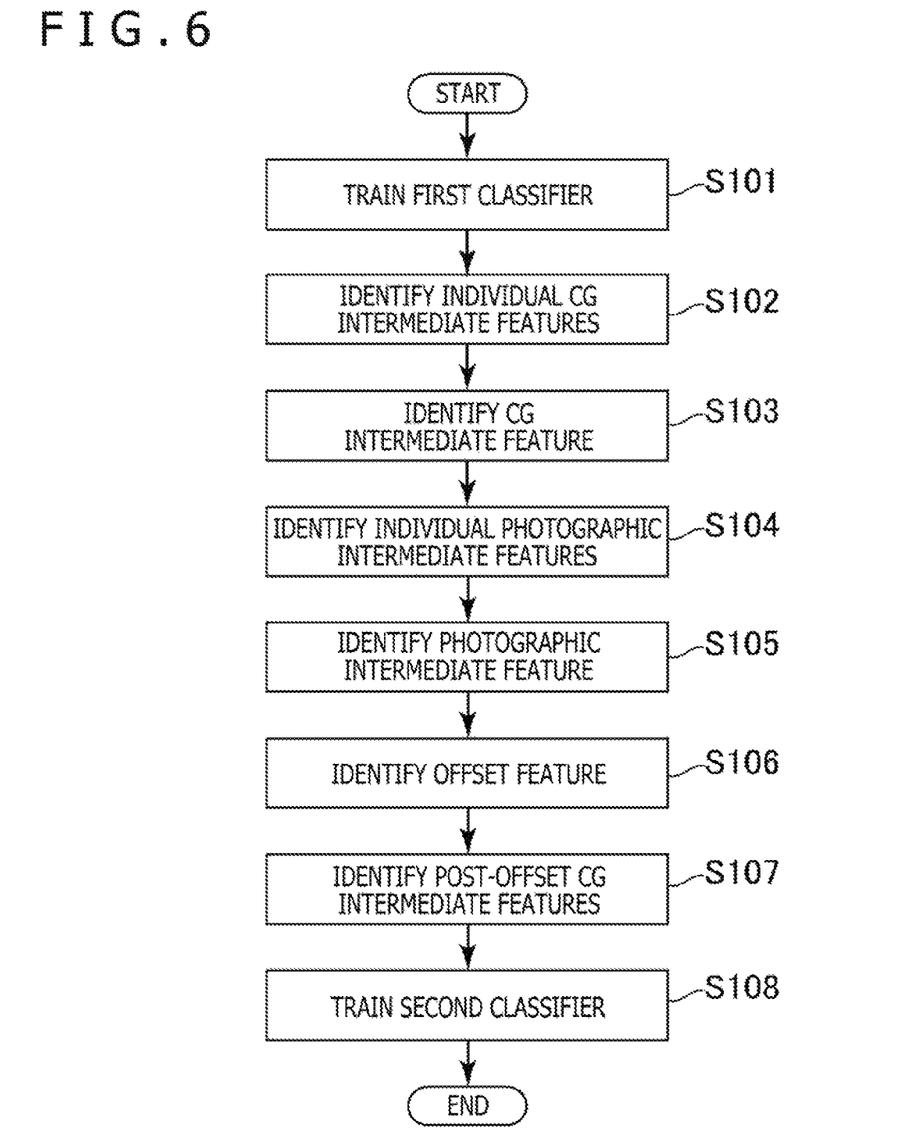
FIG. 6 is a flow diagram illustrating an example of a flow of processes performed by the information processing apparatus according to one embodiment of the present invention.

Here, an example of a flow of training processes of the second classifier 40b performed by the information processing apparatus 10 according to the present embodiment will be described with reference to a flow diagram exemplified in FIG. 6. FIG. 6 illustrates an example of the flow of the training processes of the second classifier 40b in a case where training of the second classifier 40b is executed using the post-offset CG intermediate features.

First, the first-classifier training section 42 executes training of the first classifier 40a using training data of a plurality of CG images and training data of a plurality of photographic images (S101).

Then, the intermediate feature identifying section 44 identifies, for each of input data of a plurality of CG images, an individual CG intermediate feature of each of the plurality of CG images (S102).

In the process illustrated in S102, the intermediate feature identifying section 44 may again input, as the input 66, the input data included in the training data of the CG images, which have been used in the process illustrated in S101, into the first classifier 40a that has been trained by the first-classifier training section 42. Then, the intermediate feature identifying section 44 may identify individual CG intermediate features of these CG images on the basis of the output 70 corresponding to the input 66.

Alternatively, the intermediate feature identifying section 44 may input, as the input 66, input data of new CG images, which are different from the training data of the CG images used in the process illustrated in S101, into the first classifier 40a that has been trained by the first-classifier training section 42. Then, the intermediate feature identifying section 44 may identify individual CG intermediate features of these CG images on the basis of the output 70 corresponding to the input 66.

Then, the intermediate feature identifying section 44 identifies the CG intermediate feature on the basis of the individual CG intermediate features identified for the plurality of CG images in the process illustrated in S102 (S103).

Then, the intermediate feature identifying section 44 identifies, for each of input data of a plurality of photographic images, an individual photographic intermediate feature of each of the plurality of photographic images (S104).

In the process illustrated in S104, the intermediate feature identifying section 44 may again input, as the input 66, the input data included in the training data of the photographic images, which have been used in the process illustrated in S101, into the first classifier 40a that has been trained by the first-classifier training section 42. Then, the intermediate feature identifying section 44 may identify individual photographic intermediate features of these photographic images on the basis of the output 70 corresponding to the input 66.

Alternatively, the intermediate feature identifying section 44 may input, as the input 66, input data of new photographic images, which are different from the training data of the photographic images used in the process illustrated in S101, into the first classifier 40a that has been trained by the first-classifier training section 42. Then, the intermediate feature identifying section 44 may identify individual photographic intermediate features of these photographic images on the basis of the output 70 corresponding to the input 66.

Then, the intermediate feature identifying section 44 identifies the photographic intermediate feature on the basis of the individual photographic intermediate features identified for the plurality of photographic images in the process illustrated in S104 (S105).

Then, the offset feature identifying section 46 identifies the offset feature on the basis of the CG intermediate feature identified in the process illustrated in S103 and the photographic intermediate feature identified in the process illustrated in S105 (S106).

Then, the post-offset intermediate feature identifying section 48 identifies the post-offset CG intermediate features each associated with a corresponding one of the plurality of CG images (S107).

Then, the second-classifier training section 50 executes training of the second classifier 40b using the post-offset CG intermediate features identified in the process illustrated in S107 (S108), and the processes illustrated in this process example end. In the process illustrated in S108, in a case where the post-offset CG intermediate features associated with the CG images are input as the input 78 into the second classifier 40b, input data of these CG images are input as the input 82 into the intermediate layer 76(m).

In the process illustrated in S107, input data included in training data of new CG images, which are different from the training data of the CG images used in the process illustrated in S101 or S102 may be input as the input 66 into the first classifier 40a that has been trained by the first-classifier training section 42. Then, the post-offset CG intermediate features associated with these CG images may be identified on the basis of the output 70 corresponding to the input 66. Then, in the process illustrated in S108, training of the second classifier 40*b* may be executed using these post-offset CG intermediate features and teaching data included in the training data.

Further, for example, the teaching data used for training in the process illustrated in S108 may be associated in advance with the CG images associated with the individual CG intermediate features identified in the process illustrated in S102. Then, in this case, in the process illustrated in S107, the post-offset CG intermediate features associated with the CG images may be identified on the basis of the individual CG intermediate features associated with these CG images identified in the process illustrated in S102 and the offset feature. Then, in the process illustrated in S108, training of the second classifier 40*b* may be executed using these post-offset CG intermediate features and the teaching data associated with these CG images.

It is noted that the order of execution of the processes illustrated in FIG. 6 is not limited to the order described above. For example, the processes illustrated in S102 to S105 in FIG. 6 may be executed in the order of S102, S104, S103, and S105, or may be executed in the order of S104, S105, S102, and S103.

Further, for example, the process illustrated in S108 for a plurality of process target data is not necessarily executed after the process illustrated in S107 for the plurality of process target data ends. For example, the series of processes illustrated in S107 and S108 may be executed for each of the process target data, thereby repeatedly executing the series of processes illustrated in S107 and S108.

Figure 7:
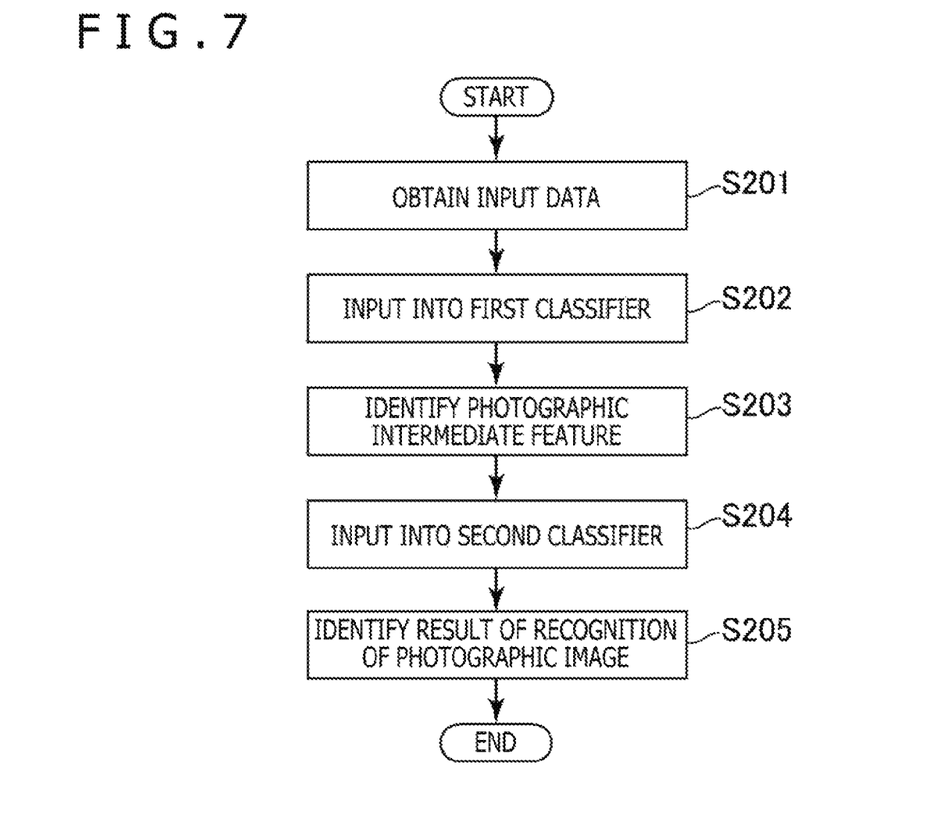
FIG. 7 is a flow diagram illustrating an example of a flow of processes performed by the information processing apparatus according to one embodiment of the present invention.

Next, an example of a flow of the image recognition process for a photographic image performed by the information processing apparatus 10 according to the present embodiment will be described with reference to a flow diagram exemplified in FIG. 7. FIG. 7 illustrates an example of the flow of the image recognition process for a photographic image in a case where training of the second classifier 40*b* has been executed through the series of processes illustrated in FIG. 6.

First, the image recognition executing section 52 obtains input data of a photographic image subjected to image recognition (S201).

Then, the intermediate feature identifying section 44 inputs, as the input 66, the input data of the photographic image, which has been obtained in the process illustrated in S201, into the first classifier 40*a* (S202).

Then, as the photographic intermediate feature of the photographic image, the intermediate feature identifying section 44 identifies the output 70 corresponding to the input 66 that has been input in the process illustrated in S202 (S203).

Then, the image recognition executing section 52 inputs, into the second classifier 40*b*, the photographic intermediate feature, which has been identified in the process illustrated in S203, as the input 78 and the input data of the photographic image, which has been obtained in the process illustrated in S201, as the input 82 (S204).

Then, as the result of recognition of the photographic image subjected to the image recognition, the image recognition executing section 52 identifies the output 80 corresponding to the input 78 and the input 82 that have been input in the process illustrated in S204 (S205), and the processes illustrated in this process example end.

Figure 8:
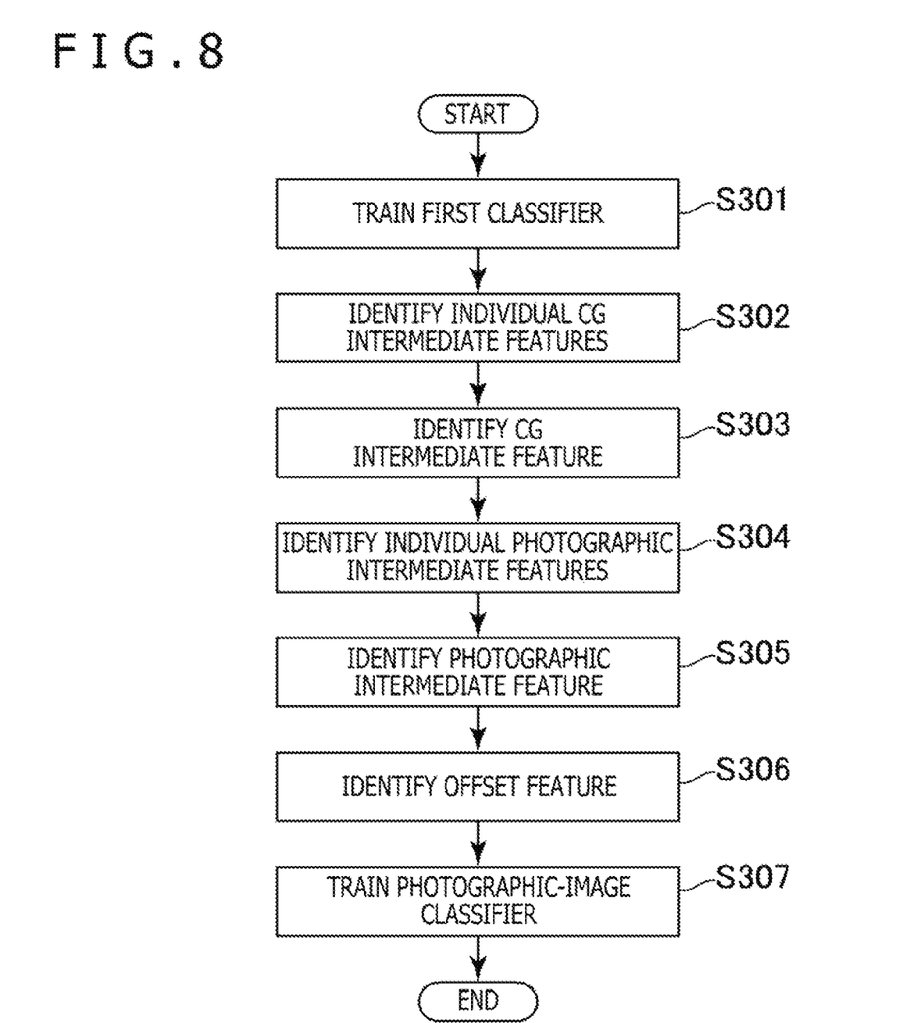
FIG. 8 is a flow diagram illustrating an example of a flow of processes performed by the information processing apparatus according to one embodiment of the present invention.

Next, another example of a flow of processes of training the second classifier 40*b* performed by the information processing apparatus 10 according to the present embodiment will be described with reference to a flow diagram exemplified in FIG. 8. FIG. 8 illustrates an example of the flow of the processes of training the second classifier 40*b* in a case where training of the second classifier 40*b* is executed using the CG intermediate features.

It is noted that the processes to be executed, which are illustrated in S301 to S306 in FIG. 8, are similar to the processes illustrated in S101 to S106 illustrated in FIG. 6. Therefore, the description of the processes illustrated in S301 to S306 will be omitted.

When the process illustrated in S306 ends, the second-classifier training section 50 executes training of the second classifier 40*b* using the CG intermediate features each associated with a corresponding one of a plurality of CG images (S307), and the processes illustrated in this process example end.

In the process illustrated in S307, in a case where the CG intermediate features associated with the CG images are input as the input 78 into the second classifier 40*b*, input data of these CG images are input as the input 82 into the intermediate layer 76(*m*).

In the process illustrated in S307, input data included in training data of new CG images, which are different from training data of CG images used in the process illustrated in S301 or S302 may be input as the input 66 into the first classifier 40*a* that has been trained by the first-classifier training section 42. Then, the output 70 corresponding to the input 66 may be identified as the CG intermediate features associated with these CG images. Then, training of the second classifier 40*b* may be executed using the identified CG intermediate features and teaching data included in the training data.

Further, for example, the teaching data used for training in the process illustrated in S307 may be associated in advance with the CG images associated with the individual CG intermediate features identified in the process illustrated in S302. Then, in this case, in the process illustrated in S307, training of the second classifier 40*b* may be executed using the individual CG intermediate features, which have been associated with these CG images and identified in the process illustrated in S302, and the teaching data associated with these CG images.

It is noted that the order of execution of the processes illustrated in FIG. 8 is not limited to the order described above. For example, the processes illustrated in S302 to S305 in FIG. 8 may be executed in the order of S302, S304, S303, and S305, or may be executed in the order of S304, S305, S302, and S303.

Figure 9:
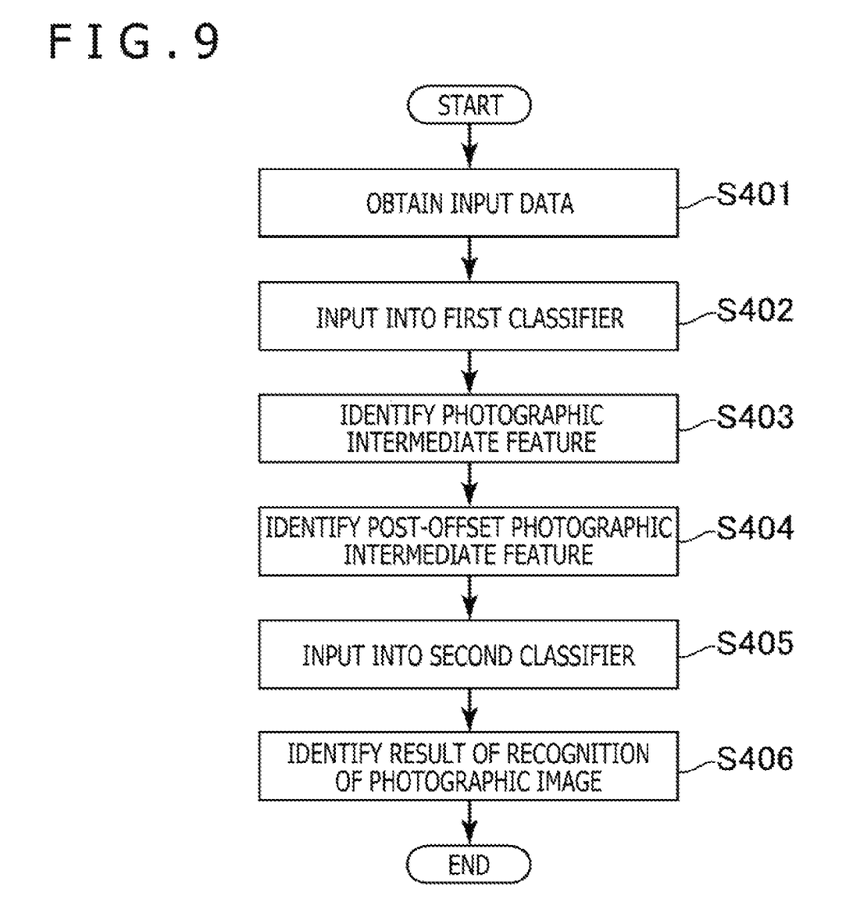
FIG. 9 is a flow diagram illustrating an example of a flow of processes performed by the information processing apparatus according to one embodiment of the present invention.

Next, another example of a flow of processes of training the second classifier 40*b* performed by the information processing apparatus 10 according to the present embodiment will be described with reference to a flow diagram exemplified in FIG. 9. FIG. 9 illustrates an example of the flow of the image recognition process for a photographic image in a case where training of the second classifier 40*b* has been executed through the series of processes illustrated in FIG. 8.

It is noted that the processes to be executed, which are illustrated in S401 to S403 in FIG. 9, are similar to the processes illustrated in S201 to S203 illustrated in FIG. 7. Therefore, the description of the processes illustrated in S401 to S403 will be omitted.

When the process illustrated in S403 ends, the post-offset intermediate feature identifying section 48 identifies the post-offset photographic intermediate feature associated with a photographic image subjected to image recognition (S404). In the process illustrated in S404, for example, the post-offset intermediate feature identifying section 48 identifies the post-offset photographic intermediate feature on the basis of the photographic intermediate feature identified in the process illustrated in S403 and the offset feature identified in the process illustrated in S306.

Then, the image recognition executing section 52 inputs, into the second classifier 40b, the post-offset photographic intermediate feature, which has been identified in the process illustrated in S404, as the input 78 and input data of the photographic image, which has been obtained in the process illustrated in S401, as the input 82 (S405).

Then, as the result of recognition of the photographic image subjected to the image recognition, the image recognition executing section 52 identifies the output 80 corresponding to the input 78 and the input 82 that have been input in the process illustrated in S405 (S406), and the processes illustrated in this process example end.

According to the present embodiment, as described above, the first classifier 40a that classifies CG images and photographic images also has a role as a feature extractor that extracts the CG intermediate feature and the photographic intermediate feature out of the output 70 from the specific intermediate layer 64a. Then, the difference in the feature between a CG image and a photographic image similar to the CG image is corrected by the offset feature identified on the basis of the CG intermediate feature and the photographic intermediate feature. In this manner, the present embodiment improves the accuracy of image recognition of a photographic image using the classifiers that have been trained using CG images.

It is noted that the present invention is not limited to the embodiment described above.

For example, the image recognition performed by the image recognition executing section 52 is not limited to semantic segmentation. For example, the image recognition executing section 52 may execute a process of identifying what an input photographic image is and/or a process of identifying what is placed where in the input photographic image.

Further, specific character strings and numerical values described above and specific character strings and numerical values in the drawings are presented by way of example, and character strings and numerical values are not limited to these character strings and numerical values.

The invention claimed is:

1. A training apparatus comprising:
an intermediate feature identifying section configured to identify an output from an intermediate layer included in a first classifier as an intermediate feature associated with an image in a case where input data of the image has been input into the first classifier, the first classifier being configured to classify a computer graphics image and a photographic image;
an offset feature identifying section configured to identify an offset feature on the basis of: the intermediate feature associated with one computer graphics image or a plurality of the intermediate features each associated with a corresponding one of a plurality of computer graphics images; and the intermediate feature associated with one photographic image or a plurality of the intermediate features each associated with a corresponding one of a plurality of photographic images;
a post-offset intermediate feature identifying section configured to identify a post-offset intermediate feature associated with a computer graphics image on the basis of the intermediate feature associated with the computer graphics image and the offset feature; and
a training section configured to execute training of a second classifier using a plurality of the post-offset intermediate features each associated with a corresponding one of a plurality of computer graphics images, the second classifier being configured to receive, in a case where image recognition is performed on a photographic image, the intermediate feature associated with the photographic image.

2. The training apparatus according to claim 1, wherein the offset feature identifying section is configured to identify the offset feature on the basis of a representative value of the plurality of the intermediate features each associated with the corresponding one of the plurality of computer graphics images and a representative value of the plurality of the intermediate features each associated with the corresponding one of the plurality of photographic images.

3. The training apparatus according to claim 1, wherein the first classifier includes a classifier that has been trained using training data of a computer graphics image and training data of a photographic image.

4. An image recognition apparatus comprising:
an intermediate feature identifying section configured to identify an output from an intermediate layer included in a first classifier as an intermediate feature associated with an image in a case where input data of the image has been input into the first classifier, the first classifier being configured to classify a computer graphics image and a photographic image;
a post-offset intermediate feature identifying section configured to identify a post-offset intermediate feature associated with a photographic image on the basis of: the intermediate feature associated with the photographic image subjected to image recognition; and an offset feature based on: the intermediate feature associated with one computer graphics image or a plurality of the intermediate features each associated with a corresponding one of a plurality of computer graphics images; and the intermediate feature associated with one photographic image or a plurality of the intermediate features each associated with a corresponding one of a plurality of photographic images; and
an image recognition executing section configured to identify an output from a second classifier as a result of the image recognition of the photographic image in a case where the post- offset intermediate feature associated with the photographic image subjected to the image recognition has been input as input data into the second classifier that has been trained using the plurality of the intermediate features each associated with the corresponding one of the plurality of computer graphics images.

5. A training method comprising:
identifying an output from an intermediate layer included in a first classifier as an intermediate feature associated with an image in a case where input data of the image has been input into the first classifier, the first classifier being configured to classify a computer graphics image and a photographic image;
identifying an offset feature on the basis of: the intermediate feature associated with one computer graphics image or a plurality of the intermediate features each associated with a corresponding one of a plurality of computer graphics images; and the intermediate feature associated with one photographic image or a plurality of the intermediate features each associated with a corresponding one of a plurality of photographic images;
identifying a post-offset intermediate feature associated with a computer graphics image on the basis of the intermediate feature associated with the computer graphics image and the offset feature; and executing training of a second classifier using a plurality of the post-offset intermediate features each associated with a corresponding one of a plurality of computer graphics images, the second classifier being configured to receive, in a case where image recognition is performed on a photographic image, the intermediate feature associated with the photographic image.

6. A non-transitory, computer readable storage medium containing a computer program, which when executed by a computer, causes the computer to carry out actions, comprising:

identifying an output from an intermediate layer included in a first classifier as an intermediate feature associated with an image in a case where input data of the image has been input into the first classifier, the first classifier being configured to classify a computer graphics image and a photographic image;

identifying an offset feature on the basis of: the intermediate feature associated with one computer graphics image or a plurality of the intermediate features each associated with a corresponding one of a plurality of computer graphics images; and the intermediate feature associated with one photographic image or a plurality of the intermediate features each associated with a corresponding one of a plurality of photographic images;

identifying a post-offset intermediate feature associated with a computer graphics image on the basis of the intermediate feature associated with the computer graphics image and the offset feature; and executing training of a second classifier using a plurality of the post-offset intermediate features each associated with a corresponding one of a plurality of computer graphics images, the second classifier being configured to receive, in a case where image recognition is performed on a photographic image, the intermediate feature associated with the photographic image.

* * * * *